C. F. BURGESS.
PORTABLE ELECTRIC LIGHT.
APPLICATION FILED JULY 5, 1912.
1,083,520.
Patented Jan. 6, 1914.
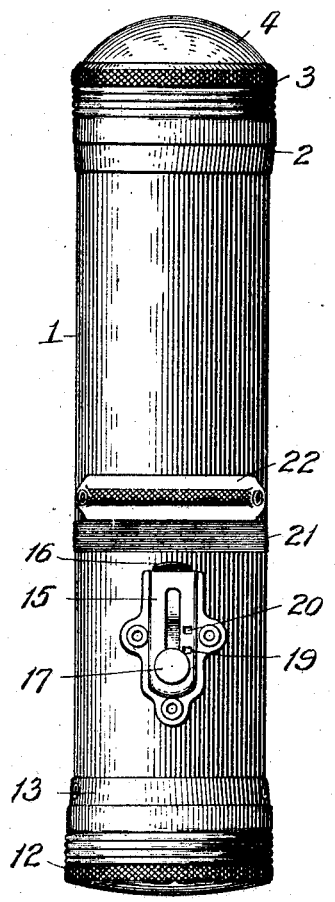
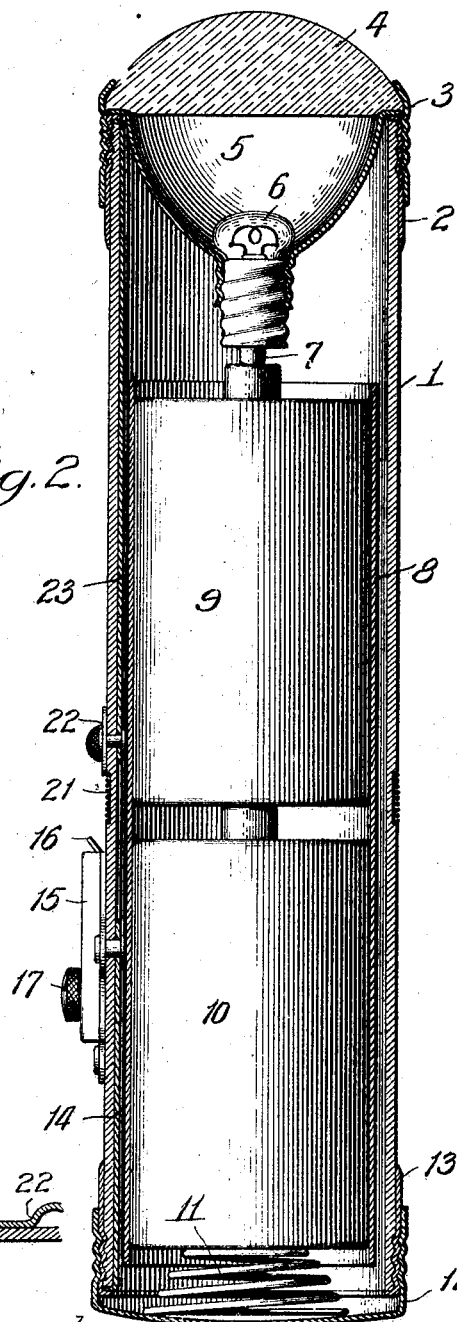
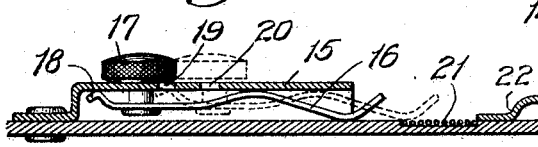
Inventor: Charles F. Burgess;

UNITED STATES PATENT OFFICE.

CHARLES F. BURGESS, OF MADISON, WISCONSIN.

PORTABLE ELECTRIC LIGHT.

1,083,520.  Specification of Letters Patent.  Patented Jan. 6, 1914.

Application filed July 5, 1912. Serial No. 707,746.

*To all whom it may concern:*

Be it known that I, CHARLES F. BURGESS, a citizen of the United States, residing at Madison, in the county of Dane and State of Wisconsin, have invented new and useful Improvements in Portable Electric Lights, of which the following is a specification.

The present invention relates to battery lamps of a portable character, more particularly those of small dimensions and of convenient shape for carrying in the pocket of the user.

It is the object of the present invention to provide a structure so arranged that the lamp will be protected from excess voltage, with consequent increase in its useful life and with consequent decrease in the cost of renewals.

Portable battery lamps, as ordinarily constructed, comprise a plurality of batteries or galvanic cells connected in series and supplying current to a miniature lamp having a very thin filament. Tungsten filaments can be used, but the filament, whether of tungsten or of other material, is necessarily very sensitive to change in voltage at the batteries and is subject to disintegration at excess voltage.

The normal or steady running voltage of a battery cell is in the neighborhood of 1.3 volts so that with a two cell battery the normal lamp voltage is in the neighborhood of 2.6 volts. However, these battery cells, when new, have a voltage considerably higher than this, as for instance 1.6 volts per cell, this being due to battery phenomena which need not here be discussed in detail. In order that the lamps may give a satisfactory light when the batteries have dropped to their normal running voltage of 2.6 volts, it is necessary to greatly overload the lamp filament during the early life of the battery. The practical result is that the lamps are greatly damaged during their early life on the batteries and so cannot work at maximum efficiency during the normal life of the battery and often do not outlast more than one set of batteries. The high cost of lamps makes their renewal a material factor in the use of portable battery lamps.

According to the present invention a resistance is disposed in convenient relation to the other parts of a battery lamp and is connected in such a manner that it may be cut into the circuit when the batteries are new and operating at normal voltage and can be cut out of circuit, progressively if desired, as soon as the batteries drop down to their normal operating voltage of about 1.3 volts per cell. This protects the filament from dangerous overload and materially increases its effective life without, however, impairing the light-giving qualities of the device when the batteries are operating at their normal output.

An embodiment of the present invention is shown in the accompanying drawing in which—

Figure 1 is an elevation of a hand lamp with resistance wound about the tubular casing. Fig. 2 is a sectional elevation, somewhat enlarged, of the structure shown in Fig. 1. Fig. 3 is a detail of the circuit closing device.

The structure shown in the drawings has a cylindrical casing 1 of fiber, or other suitable insulating material, provided at one end with a threaded metal collar 2 over which may be screwed a threaded cap 3 arranged to hold the lens 4 and the reflector 5 against the end of the fiber tube 1. The incandescent lamp 6 is screwed into the center of the metal reflector 5 and has a projecting contact 7 for completing the circuit to one of the battery terminals.

The battery is contained in a pasteboard tube 8 and comprises a plurality of cells 9 and 10 placed end to end in usual manner with the carbon electrodes of the lowermost cell making electrical connection with the zinc container of the cell immediately above. A coiled spring 11 carried by the threaded end cap of the lamp holds the batteries firmly against the lamp terminal 7. A metal collar 13 secured to tube 1 serves to hold the end cap 12 in position.

Electrical connections from the zinc electrode of the lowermost battery to the outer or tubular electrode of lamp 6 includes the spring 11 and cap 12 and also a conductor 14 arranged within the fiber tube 1 and leading from the base of the lamp to a contact device placed at the side of the lamp in convenient position for manipulation by the operator.

The contact device of the structure here shown as an illustrative embodiment of the present invention comprises a metal box 15 riveted to the fiber tube 1 and carrying a spring tongue 16 which can be manipulated by means of a button 17 projecting above the box within easy reach of the thumb of the hand which holds the lamp. The rear or trailing end 18 of this tongue slides along the under face of the box but can slip upward into notches or openings 19 and 20 which act as stops to govern the forward movement of the tongue.

The resistance used to absorb the excess voltage when the lamps are new may be arranged in the form of a winding 21 wound about the fiber tube 1 in a suitable recess, one end of this wire being dead-ended and the other end being connected to a metal contact plate 22 permanently connected with the conductor 23 which leads to the upper end of the lamp and is there connected with the reflector 5 and thus with the outer terminal of the lamp 6. The resistance wire, composed of any suitable metal or alloy and of suitable cross section and length, is preferably oxidized or enameled to insulate adjacent turns, and this protective covering is scraped away or removed along the line of movement of spring 16. A forward movement of the button 17, such as may be effected easily by the thumb of the operator, will force spring 16 forward into contact with the resistance winding, thereby completing the circuit to the battery, but including the resistance in the lamp circuit and so cutting down the voltage on the filament to a safe value. The engagement of the trailing end 18 of the spring in the slot 19 serves to govern the forward motion of the spring and by its retarding motion indicates to the operator that the spring is on the first step of the resistance. A further forward motion of the contact spring will progressively cut out the resistance until, when the spring is in direct contact with plate 22, the resistance will be all out of circuit and the lamp will be connected directly across the battery. Ordinarily, the filament to be used in the lamp will be adjusted to the normal voltage of the battery with which it is to be used and the resistance 21 will be employed to cut down the excess voltage of the battery during that interval of time which may elapse before the batteries settle down to their normal working voltage.

While I have herein set forth with some degree of particularity an embodiment of this invention, it should be understood that the invention is susceptible of a variety of other embodiments and many minor changes may be made in the parts herein set forth without departure from the spirit of the invention and without sacrificing its benefits and advantages.

Having thus described my invention, what I claim as new and desire to secure by Letters Patent of the United States is:

1. In a hand lamp, the combination of a casing, a plurality of batteries arranged therein and connected in series, a lamp in contact with the inner electrode of one of said batteries, a resistance winding for the lamp circuit encircling said casing and permanently connected to one terminal of the lamp, and a sliding circuit closer permanently connected with one of said batteries and movable into and out of contact with said resistance winding and over successive turns thereof to vary the battery voltage at said lamp.

2. In a pocket lamp, the combination of a casing, a plurality of batteries within said casing, a lamp contacting with the end of one of said batteries, a resistance wire encircling said casing in a plurality of turns and lying flush with the exterior thereof, said wire being permanently connected with one terminal of said lamp, and a sliding circuit closer permanently connected with a battery electrode and movable by the thumb of the operator, across said resistance wire to change the voltage impressed on said lamp or to open circuit the same.

3. In a hand lamp, the combination of a cylindrical casing, a lamp mounted at the end of said casing, a plurality of batteries arranged one above another within said casing and connected in series to said lamp, a resistance wire wound about said casing and embedded therein flush with the exterior, and a sliding circuit closer within reach of the operator's thumb and movable along said casing into and out of contact with said resistance wire to complete and control the circuit through said wire to said lamp.

4. In a hand lamp, the combination of a cylindrical casing, a lamp mounted at the end of said casing, batteries arranged in series within said casing, a resistance wire wound about said casing and embedded therein flush with the exterior, means permanently connecting one end of said wire with said lamp, the other end being free, a sliding circuit closer within reach of the operator's thumb when the casing is held in the hand, said circuit closer being permanently connected with one of said batteries and movable to complete the circuit through said wire to said lamp and adjustable along said wire to protect said lamp from the high initial voltage of said batteries and to compensate for changes in the batteries as they age, and stops governing the forward movement of the circuit closer.

In witness whereof, I hereunto subscribe my name to this specification in the presence of two witnesses.

CHARLES F. BURGESS.

Witnesses:
NAOMI M. BAYLIS,
BESSIE M. OLESON.